United States Patent
Singh et al.

(10) Patent No.: US 11,966,966 B2
(45) Date of Patent: *Apr. 23, 2024

(54) MULTI-LISTING COMBINED OFFER SYSTEM

(71) Applicant: eBay Inc., San Jose, CA (US)

(72) Inventors: Vikas Singh, San Jose, CA (US); Muthuramalingam Sundaresan, Fremont, CA (US); Bhupendra G. Jain, Cupertino, CA (US); Kiran Kanchamreddy, Milpitas, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,913

(22) Filed: May 9, 2023

(65) Prior Publication Data

US 2023/0281697 A1 Sep. 7, 2023

Related U.S. Application Data

(63) Continuation of application No. 17/337,385, filed on Jun. 2, 2021, now Pat. No. 11,663,648, which is a
(Continued)

(51) Int. Cl.
G06Q 30/00 (2023.01)
G06Q 30/0283 (2023.01)
G06Q 30/0601 (2023.01)

(52) U.S. Cl.
CPC ..... *G06Q 30/0635* (2013.01); *G06Q 30/0283* (2013.01); *G06Q 30/0631* (2013.01); *G06Q 30/0641* (2013.01)

(58) Field of Classification Search
CPC ........... G06Q 30/0635; G06Q 30/0283; G06Q 30/0631; G06Q 30/0641
See application file for complete search history.

(56) References Cited

U.S. PATENT DOCUMENTS 8,260,670 B2 * 9/2012 Walker ................. G06Q 30/02
705/27.1
8,341,036 B2 * 12/2012 Hartman ............... G06Q 30/04
705/26.81
(Continued)

FOREIGN PATENT DOCUMENTS

WO 2020219166 10/2020

OTHER PUBLICATIONS

Ebay community (Year: 2018).*
(Continued)

*Primary Examiner* — Kathleen Palavecino
(74) *Attorney, Agent, or Firm* — SCHWEGMAN LUNDBERG & WOESSNER, P.A.

(57) ABSTRACT

Systems and methods for managing a multi-listing combined offer are provided. A networked system receives an indication to add a combination of items from multiple sellers into a virtual cart. In response, the networked system causes presentation of a user interface showing a combination of items from multiple sellers. The networked system receives, from the buyer, a buyer offer price for the combination of items. In response, the networked system accesses, from a data storage, item information for each item of the combination of items, whereby the item information includes a seller identifier, an original item price, and shipping cost for each item. The networked system then generates, based on the accessed item information and the buyer offer price, a split offer price for each seller, whereby the split offer price is a split of the buyer offer price. The split offer price is then presented to each corresponding seller.

20 Claims, 6 Drawing Sheets

Related U.S. Application Data continuation of application No. 16/392,400, filed on Apr. 23, 2019, now Pat. No. 11,042,926.

(56) References Cited

U.S. PATENT DOCUMENTS

| | | | |
|---|---|---|---|
| 8,732,018 | B2 | 5/2014 | Mesaros |
| 11,042,926 | B2 | 6/2021 | Singh et al. |
| 11,663,648 | B2 | 5/2023 | Singh et al. |
| 2002/0010625 | A1 | 1/2002 | Smith et al. |
| 2008/0046329 | A1 | 2/2008 | Logan |
| 2008/0071692 | A1 | 3/2008 | Jain |
| 2009/0043685 | A1 | 2/2009 | Benjamin et al. |
| 2009/0138398 | A1 | 5/2009 | Cole et al. |
| 2009/0307145 | A1 | 12/2009 | Mesaros |
| 2010/0023357 | A1 | 1/2010 | Walker et al. |
| 2012/0179516 | A1* | 7/2012 | Fakhrai ............. G06Q 30/0207 705/14.1 |
| 2015/0161709 | A1 | 6/2015 | Zakas et al. |
| 2020/0342516 | A1 | 10/2020 | Singh et al. |
| 2021/0287278 | A1 | 9/2021 | Singh et al. |

OTHER PUBLICATIONS

"International Application Serial No. PCT US2020 022029, International Search Report dated Jun. 12, 2020", 2 pgs.

"International Application Serial No. PCT US2020 022029, Written Opinion dated Jun. 12, 2020", 5 pgs.

"How to combine orders into one shipment on eBay", [Online]. Retrieved from the Internet: https: www.zenstores.com tutorials how-combine-orders-one-shipment-ebay , (Oct. 8, 2015).

"U.S. Appl. No. 16/392,400, Non Final Office Action dated Nov. 2, 2020", 17 pgs.

"U.S. Appl. No. 16/392,400, Notice of Allowance dated Feb. 23, 2021", 8 pgs.

"International Application Serial No. PCT US2020 022029, International Preliminary Report on Patentability dated Nov. 4, 2021", 7 pgs.

"U.S. Appl. No. 17/337,385, Non Final Office Action dated Sep. 7, 2022", 7 pgs.

"U.S. Appl. No. 17/337,385, Notice of Allowance dated Jan. 24, 2023", 7 pgs.

U.S. Appl. No. 16/392,400 U.S. Pat. No. 11,042,926, filed Apr. 23, 2019, Multi-Listing Combined Offer System.

U.S. Appl. No. 17/337,385 U.S. Pat. No. 11,663,648, filed Jun. 2, 2021, Multi-Listing Combined Offer System.

\* cited by examiner

MULTI-LISTING COMBINED OFFER SYSTEM

CLAIM OF PRIORITY

This Application is a Continuation of U.S. application Ser. No. 17/337,385, filed Jun. 2, 2021, which is a Continuation of U.S. application Ser. No. 16/392,400, filed Apr. 23, 2019, each of which is hereby incorporated by reference in its entirety.

TECHNICAL FIELD

The subject matter disclosed herein generally relates to machines configured to provide an offer system, and to technologies by which such special-purpose machines become improved compared to other machines that provide offer systems. Specifically, the present disclosure addresses systems and methods to manage multi-listing combined offers associated with a plurality of sellers.

BACKGROUND

Conventionally, marketplace systems allow a buyer to make an offer to a single seller. Additionally, bulk offers for more than one item are also limited to a single seller. Typically, a seller has limited inventory or types of items that they will sell. If a buyer wants to purchase multiple items (e.g., related items) from different sellers, the buyer would need to find the items from each seller and purchase each item separately.

BRIEF DESCRIPTION OF DRAWINGS

Various ones of the appended drawings merely illustrate example embodiments of the present invention and cannot be considered as limiting its scope.

DETAILED DESCRIPTION

Figure 1:
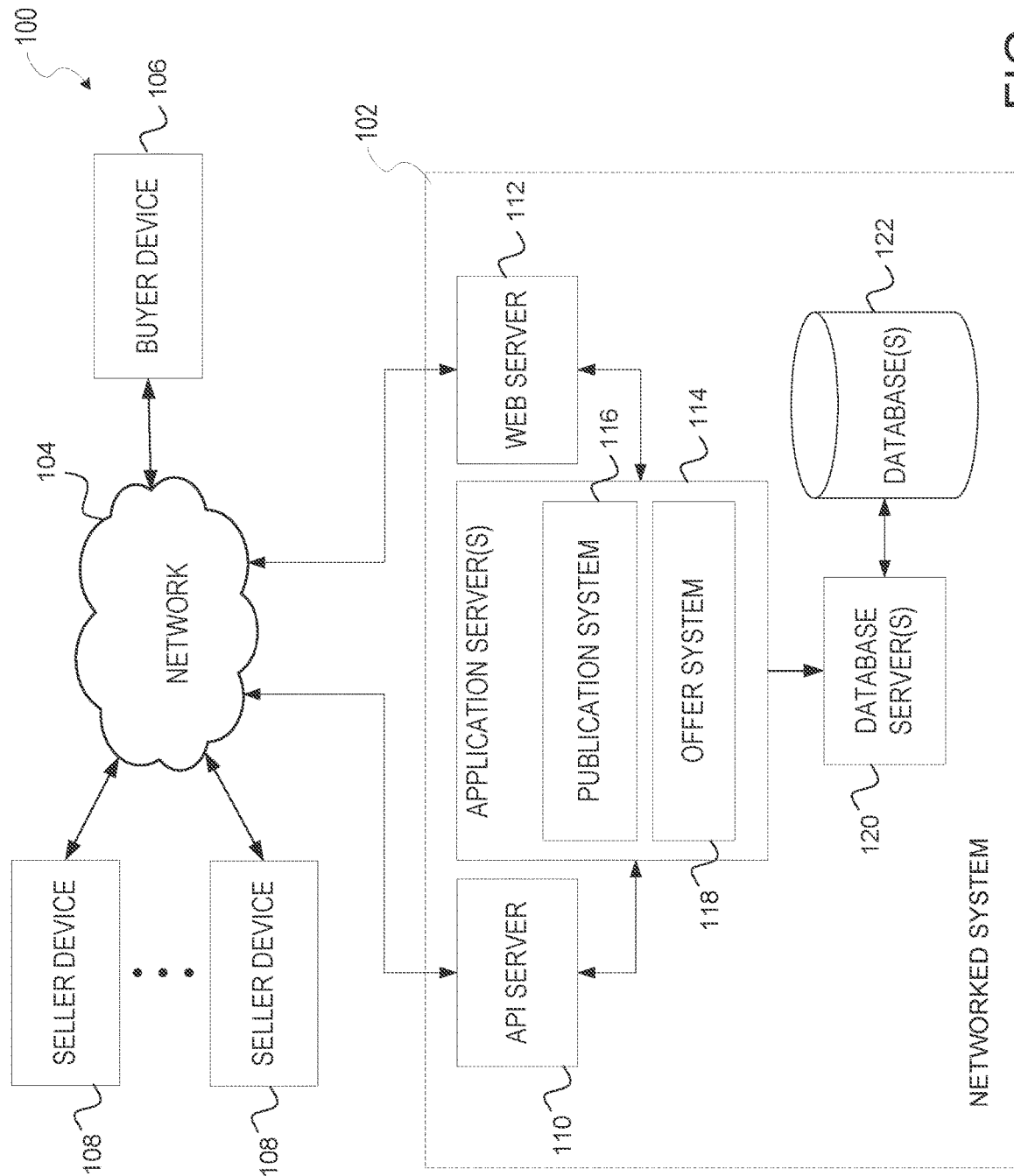
FIG. 1 is a diagram illustrating a network environment suitable for providing a multi-listing combined offer system, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to a system that manages and recommends items from multiple sellers to a single buyer. In some embodiments, the system determines, based on one or more items in a virtual cart of the buyer, further items (e.g., related items, items from the user's wishlist or watchlist, items the user has browsed or purchased previously) from other item listings that can be combined with the one or more items in the virtual cart to generate a recommended combination in order to offer a better deal. The recommended items are then presented to the buyer via a user interface displaying the virtual cart. The user can then accept the recommendation and add the further item(s) to their virtual cart. In some embodiments, the system, in a background process, analyzes items available in a marketplace and generates combinations of related items that can be offered together (e.g., frequent bought together). At run time, the system compares the items or a category of each item in the virtual cart along with items or categories of items that user has previously shown interest in to determine the recommended items. In response to acceptance of the recommendation, the system determines sellers that can offer the recommended items (e.g., at a lowest original price). In some cases, the lowest original price includes combined shipping on items to reduce the price.

Once the cart is populated with the combination of items from the multiple sellers and a total price for the combination of items is displayed, the buyer has an option make a single offer to lower the total price for the combination. The buyer indicates their offer price via the user interface. The system then negotiates, on behalf of the buyer, with the sellers. In example embodiments, the system determines, based on ratios and reduced shipping costs, a way to split the buyer offer price between the multiple sellers and presents each seller with information regarding the original price, any reduced shipping costs (from combining shipping for multiple items), and their portion of the buyer offer price. The seller can accept, reject, or counteroffer.

Thus, the present disclosure provides technical solutions for managing a multi-listing combined offer from a single buyer to a plurality of sellers. In particular, an offer system "negotiates" between a single buyer and a plurality of sellers by determining a combined total price for the multi-listing combination or bundle (also referred to as "combination of items"), determines a split offer price for each seller based on a buyer offer price, and manages an acceptance process by both the sellers and buyer. As a result, one or more of the methodologies described herein facilitate solving technical problems associated with managing multi-seller virtual carts. In particular, by providing an offer system that negotiates between the single buyer and plurality of sellers, example embodiments reduce efforts needed in order by a buyer to manually find and purchase each item from a different seller separately. As a result, resources used by one or more machines, databases, or devices (e.g., within an environment) may be reduced. Examples of such computing resources include processor cycles, network traffic, memory usage, data storage capacity, power consumption, network bandwidth, and cooling capacity.

With reference to FIG. 1, an example embodiment of a network environment 100 that provides a multi-listing combined offer system is shown. A networked system 102 provides server-side functionality via a communication network 104 (e.g., the Internet, wireless network, cellular network, or a Wide Area Network (WAN)) to a plurality of user devices including a buyer device 106 and seller devices 108. In one embodiment, the networked system 102 includes or is linked to a network-based marketplace that manages goods and items, responds to requests for item listings, publishes item listings of items available on the network-based marketplace, and manages a negotiation process between a single buyer and multiple sellers.

The user devices (buyer device 106 and/or seller devices 108) interface with the networked system 102 via a connection with the network 104. Depending on the form of each of the user devices, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs are associated with a user device, such as the buyer device 106 executing a web client (e.g., an Internet browser), which may be in communication with the networked system 102. The UIs may also be associated with one or more applications executing on the buyer device 106 or the seller devices 108, such as a mobile application or operating system designed for interacting with the networked system 102.

The user devices may comprise, but are not limited to, a smartphone, tablet, laptop, multi-processor systems, microprocessor-based or programmable consumer electronics, game consoles, set-top boxes, a server, or any other communication device that a user may utilize to access the networked system 102. In some embodiments, the user devices each comprise a display module (not shown) to display information (e.g., in the form of user interfaces). In further embodiments, the user devices each comprise one or more of a touch screen, accelerometer, camera, microphone, and Global Positioning System (GPS) device. The buyer device 106 is used by a (potential) buyer to select items and provide offers for a combination of items from multiple sellers, while the seller devices 108 are used by sellers to publish listings for items for sale, respond to offers from buyers, and complete a transaction for items.

The user devices may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in the user device, then this application is configured to locally provide the user interface and at least some of the functionalities with the application configured to communicate with the networked system 102, on an as needed basis, for data or processing capabilities not locally available (e.g., access to a database of published items, to authenticate a user, to verify a method of payment, to negotiate an offer with multiple sellers). Conversely if the e-commerce site application is not included in the user device, the user device may use its web browser to access the e-commerce site (or a variant thereof) hosted on the networked system 102.

Turning specifically to the networked system 102, an application program interface (API) server 110 and a web server 112 are coupled to, and provide programmatic and web interfaces respectively to, one or more application servers 114. The application server 114 hosts a publication system 116 and an offer system 118, each of which may comprise one or more modules, applications, or engines, and which can be embodied as hardware, software, firmware, or any combination thereof. The application servers 114 are, in turn, coupled to one or more database servers 120 that facilitate access to one or more information storage repositories or databases 122. In one embodiment, the database 122 is a storage device that stores content (e.g., publications or item listings, store information, buyer profiles including past browsing and purchase history, seller profiles) that is used by the networked system 102.

In example embodiments, the publication system 116 publishes content on a network (e.g., Internet). As such, the publication system 116 provides a number of publication functions and services to the users (e.g., buyers and sellers) that access the networked system 102. For example, the publication system 116 can host a marketplace application that provides a number of marketplace functions and services to users, such as publishing, listing, and price-setting mechanisms whereby a seller may list (or publish information concerning) goods or services (also collectively referred to as "items") for sale, a potential user or buyer can express interest in or indicate a desire to purchase such goods or services, and a transaction pertaining to the goods or services is processed. However, it is noted that the publication system 116 may, in alternative embodiments, be associated with a non-marketplace environment such as an informational environment (e.g., search engine) or social networking environment.

The offer system 118 comprises a recommendation and negotiation platform that provides a number of functions to generate and manage multi-listing combinations and offers. The offer system 118 will be discussed in more detail in connection with FIG. 2.

While the publication system 116 and offer system 118 are shown in FIG. 1 to form part of the networked system 102, it will be appreciated that, in alternative embodiments, the publication system 116 or offer system 118 may form part of a separate service that is distinct from the networked system 102. Furthermore, while the client-server-based network environment 100 shown in FIG. 1 employs a client-server architecture, the present inventive subject matter is of course not limited to such an architecture, and could equally well find application in a distributed or peer-to-peer architecture system, for example. The publication system 116 and offer system 118 can also be implemented as standalone software programs, which do not necessarily have networking capabilities.

In example embodiments, any of the systems, servers, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems, servers, or devices illustrated in FIG. 1 may be combined into a single system, server, or device, and the functions described herein for any single system, server, or device may be subdivided among multiple systems or devices. Additionally, any number of networked systems 102, buyer devices 106, and seller devices 108, may be embodied within the network environment 100. Furthermore, some components or functions of the network environment 100 may be combined or located elsewhere in the network environment 100.

Figure 2:
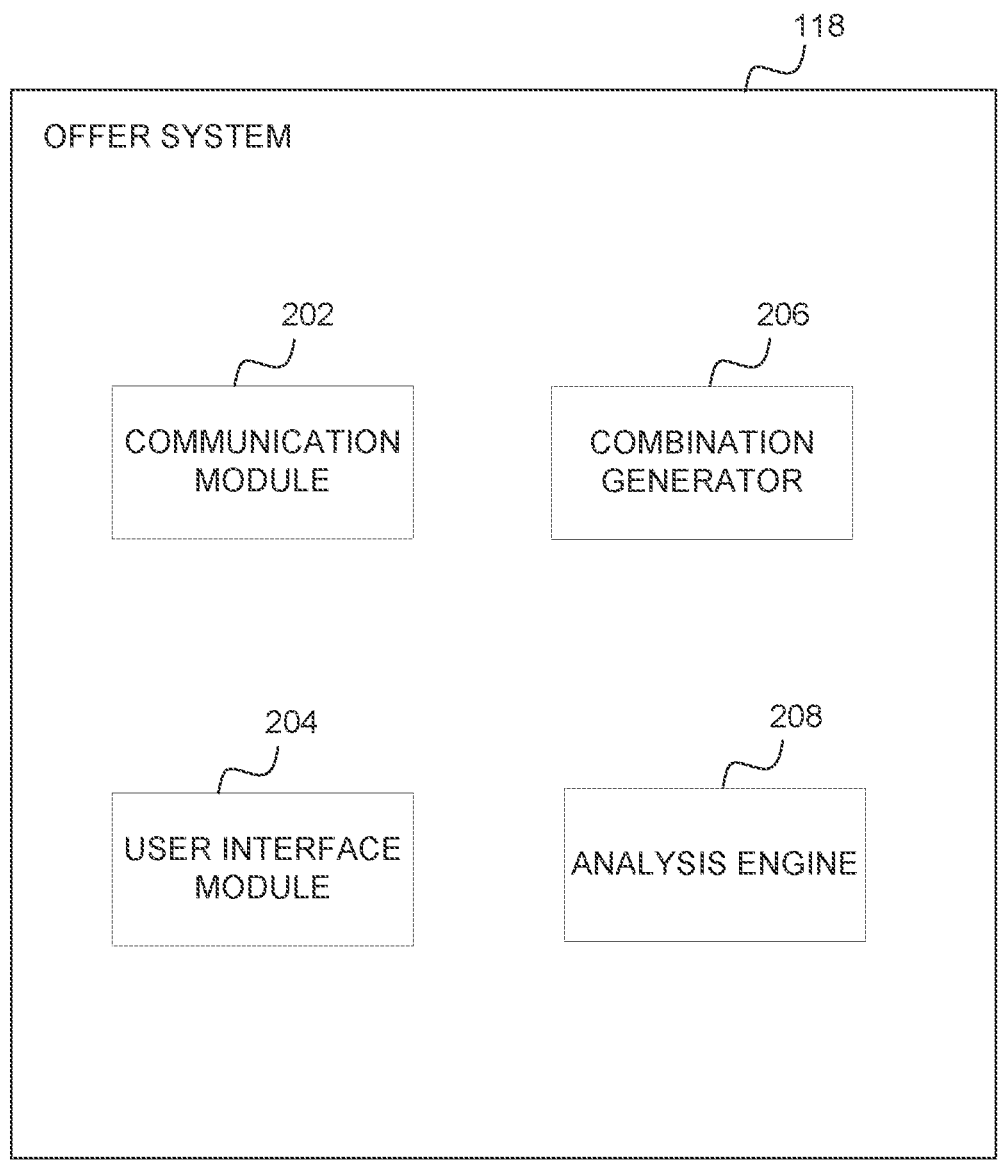
FIG. 2 is a block diagram illustrating components of the multi-listing combined offer system, according to some example embodiments.

FIG. 2 is a block diagram illustrating components of the offer system 116, according to some example embodiments. In example embodiments, the offer system 116 comprises components that manages generation of item combinations and a negotiation process. To enable these operations, the offer system 118 comprises a communications module 202, a user interface module 204, a combination generator 206, and an analysis engine 208 all configured to communicate with each other (e.g., via a bus, shared memory, or a switch). The offer system 118 may also comprise other components (not shown) that are not pertinent to example embodiments. Furthermore, any one or more of the components (e.g., engines, modules, storage) described herein may be implemented using hardware (e.g., a processor of a machine) or a combination of hardware and software. Moreover, any two or more of these components may be combined into a single component, and the functions described herein for a single component may be subdivided among multiple components.

The communications module 202 manages exchange of communications with the buyer device 106 and seller devices 108 (collectively referred to herein as "user devices"). Specifically, the communications module 202 receives an indication to add a combination of items from multiple sellers to a virtual cart presented on a user interface. In some cases, the receipt of the indication is in response to a recommendation of items presented by the communication module 202. In response, the communication module 202 works with the user interface module 204 to update the user interface with a combination of items from multiple sellers. The communication module 202 then receives, via the user interface, a buyer offer price for the combination of items and communicates a split offer price to each seller of the multiple sellers.

The user interface module 204 generates and causes presentation (e.g., via the communications module 202) of a buyer user interface that includes the virtual cart. In some embodiments, the buyer user interface includes a selection that allows the buyer to accept a recommendation of additional items to the one or more items that the buyer has already placed in their virtual cart resulting in a multi-listing combination of items. The buyer user interface also includes a field that allows the buyer to indicate a buyer offer price for the combination of items.

Similarly, the user interface module 204 generates and causes presentation (e.g., via the communications module 202) of a seller user interface to each seller of the multiple sellers. The seller user interface presents negotiation information including, for example, an item total and a shipping total for all the items of the seller in the combination of items and split offer price based on the buyer offer price. The seller user interface provides one or more fields that allow the seller to accept the split price, reject the split price, or present a counteroffer.

The combination generator 206 is configured to manage multi-listing combinations of items including providing recommendations of items to add to items in the buyer's virtual card in order to generate the combination of items. In example embodiments, the combination generator 206 analyzes the content (e.g., one or more items) in the virtual cart of the buyer and determines based on the content, further items that can be combined with the one or more items in the virtual cart to offer a better deal. In some embodiments, the combination generator 206, in a background process, analyzes items available in the networked system 102 and generates combinations of related items that can be offered together (e.g., frequent bought together). At run time, the combination generator 206 compares the items in the virtual cart to items that are categorized as being related or that the buyer has shown interest in (which may or may not be related to the item in the virtual cart) to determine one or more combinations of items that can be offered. Thus, the recommended items can comprise one or more of related items (e.g., frequently bought together), items from the buyer's wishlist or watchlist, or related items to items the user has browsed or purchased in the past. For example, the combination generator 206 can access the buyer's wishlist and identify an item that may be related to an item in the virtual cart and recommend that the item from the wishlist be added to the virtual cart. In another example, the combination generator 206 can access the buyer's purchase history and identify a related item. For instance, the buyer may have purchases a bicycle in the past and now has a bike helmet in the virtual cart. In this example, the combination generator 206 can recommend a portable bike tire pump to the buyer.

If the buyer accepts the recommendation (or part of a recommendation if more than one item is recommended), the combination generator 206 identifies sellers in the networked system 102 selling the accepted, recommended item (e.g., having a listing selling the accepted item). The combination generator 206 may first determine whether any sellers of items already in the virtual cart (before the recommendation was accepted) is selling the additional item. If none of these sellers are selling the additional item, the combination generator 206 then searches the networked system 102 to identify sellers with a lowest price for the additional item or that are known to be willing to negotiate on price (e.g., based on past transactions). Once identified, the combination generator 206 determines a total price for the combination of items, which is then presented in the buyer user interface.

In example embodiments, the analysis engine 208 manages the negotiation process between the buyer and the multiple sellers. In particular, the analysis engine 208 accesses a buyer offer price and analyzes the listings of the items in the combination to determine a split offer price for each seller. In example embodiments, the analysis engine 208 determines a total cost for the item(s) for each seller (also referred to as "item total") and a shipping cost for each seller. In some embodiments, the shipping cost can be reduced by combining shipping for items from the same seller or combining items from sellers in a same location (e.g., from a same distribution warehouse). In some cases, the analysis engine 208 has access to item shipping information such that the analysis engine 208 can determine a weight and dimension for each item and determine whether items can be combined into a same shipping container (e.g., a flat rate post office box) at a shipping rate that is less than shipping the items individually.

The analysis engine 208 then determines a ratio and split offer price for each seller. In one embodiment, the analysis engine 208 sums the item totals for the multiple sellers and sums the total shipping costs for the sellers. The analysis engine 208 subtracts the total shipping cost, which is not negotiable, from the buyer offer price to obtain a remaining value. The ratio is then determined by dividing each seller's item total by a summation of the item totals for all of the sellers. Subsequently, the analysis engine 208 applies the ratio determined for each seller to the remaining value to obtain the split offer price for each seller.

To illustrate in an example, the following table shows items in a multi-listing combination of items. Assume that the buyer has presented a buyer offer price of $350 for the combination of items.

| Seller | Item | Cost | Item Ship |
|---|---|---|---|
| 1 | 1 | $100 | $10 |
| 1 | 2 | $120 | $8 |
| 2 | 3 | $80 | $5 |
| 2 | 4 | $50 | $12 |

As shown, the combination has items are from two sellers, with item1 and item2 from seller1 and item3 and item4 from seller2. The total item cost for seller1 is $220 ($100+$120) and for seller2 is $130 ($80+$50). The total shipping costs is $35. Thus, the total original price for the combination (summation of the item totals for the sellers and the total shipping costs) is $385, which is $35 more than the buyer offer price. Assuming that the items from the same seller can be combined into a single shipping container, the combination (reduced) shipping cost is $10 for seller1 and $12 for seller2 resulting in a total combined shipping cost of $22. The analysis engine 208 then determines the remaining value by subtracting the total combined shipping cost from the buyer offer price ($350-$22=$328).

A ratio for each seller is determined based on the item total for each seller and the summation of item totals for the sellers ($350). As such, the ratio for seller1 is 220/350=0.63 and the ratio for seller2 is 130/350=0.37. Each seller's ratio is applied to the remaining value to determine each seller's split portion. Here, seller1's split portion is $206.64 and seller2's split portion is $121.36. Finally, the shipping cost for each seller is added to their split portion to generate their split offer price.

In some embodiments, the communication module 202 and the user interface module 204 presents the seller user interface that includes the split offer price to each of the sellers. The seller user interface may also include the item total for each seller and the shipping cost for each seller. The seller is not notified about other seller(s) involved in the combination or what split offer price the other seller(s) are being offered. The seller user interface also includes fields or selections that allow each seller to accept the split offer price or reject the split offer price. If one of the sellers rejects their split offer price, the analysis engine 208 can, in one embodiment, determine an adjusted offer price to present to the buyer that is a summation of the split offer price(s) that are accepted and the item total and shipping cost of the seller that rejected the split offer price. The buyer can then either accept the adjusted offer price, reject the adjusted offer price, or remove the item(s) from the seller that is rejecting their split offer price from their virtual cart. In an alternative embodiment, the combination generator 206 identifies a different seller that is willing to sell the item(s) at the rejected split offer price.

In some embodiments, a seller can provide a counteroffer to the split offer price. The counteroffer can, in some cases, include a suggestion of a further item. For example, a seller has two items in the combination and is being presented with a split offer price of $150 for the two items. The seller can offer to sell a third, related item (e.g., having a value of $25) for a total split offer price of $170. The counteroffer is presented to the buyer via the buyer user interface. The counteroffer can include an adjusted offer price that sums the counteroffer price with the accepted split offer prices. The buyer can then either accept the adjusted offer price, reject the adjusted offer price, or remove the item(s) from the seller that is counteroffering from the virtual cart.

Figure 3:
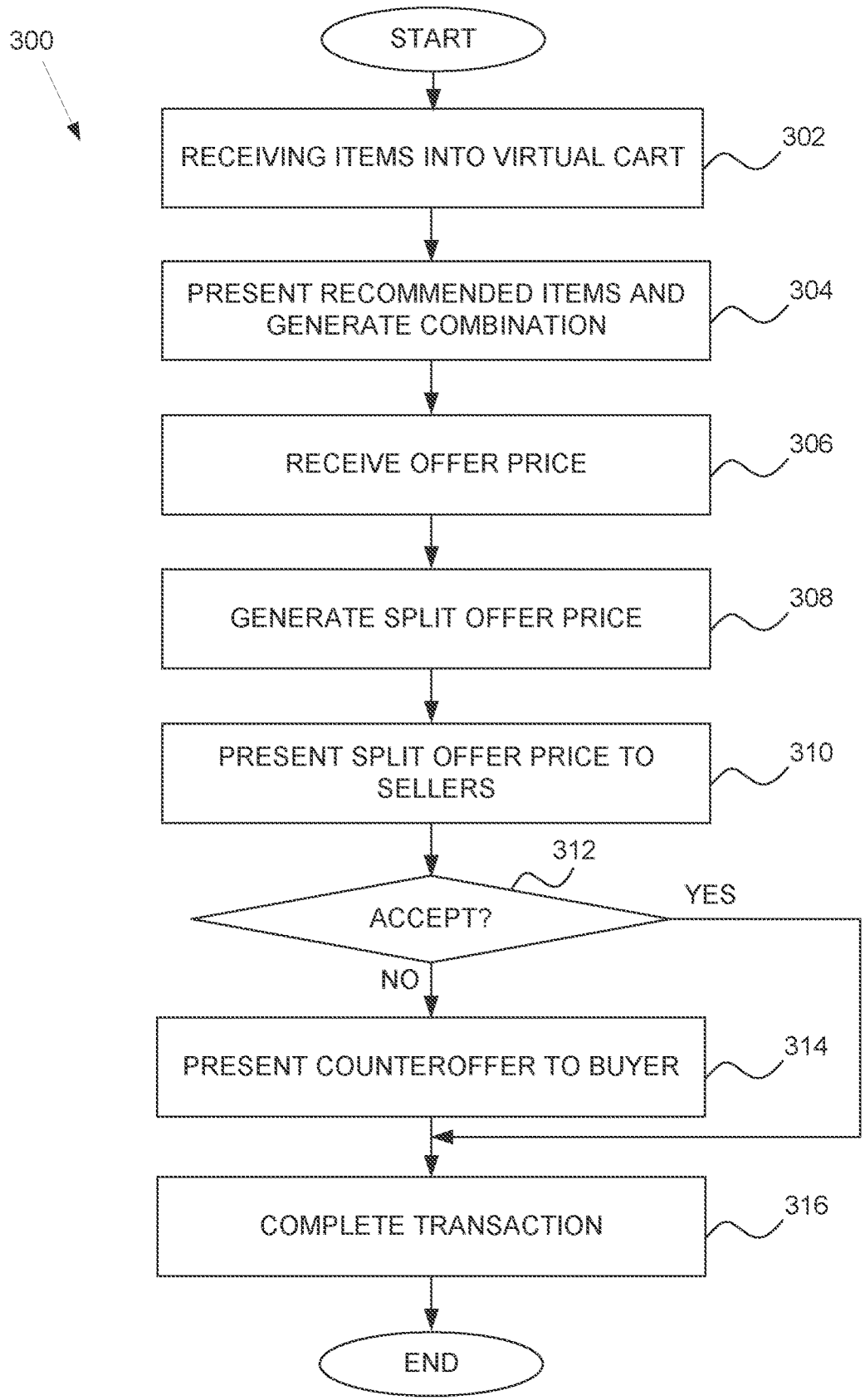
FIG. 3 is a flowchart illustrating operations of a method for managing a multi-listing combined offer transaction in the networked environment, according to some example embodiments.

FIG. 3 is a flowchart illustrating operations of a method 300 for managing a multi-listing combined offer transaction in the networked environment, according to some example embodiments. Operations in the method 300 may be performed by the offer system 118, using components described above with respect to FIG. 2. Accordingly, the method 300 is described by way of example with reference to the offer system 118. However, it shall be appreciated that at least some of the operations of the method 300 may be deployed on various other hardware configurations or be performed by similar components residing elsewhere in the network environment 100. Therefore, the method 300 is not intended to be limited to the offer system 118.

In operation 302, the offer system 118 receives, from a buyer, an indication to add one or more items to a virtual cart. In some embodiments, the indication comprises a series of manual additions by a buyer, whereby the buyer finds and adds each item to their virtual cart. The items can be from a single seller or from a plurality of sellers.

In operation 304, the combination generator 206 identifies and causes presentation of recommended items based, in part, on the item(s) in the virtual cart, and generates a multi-listing combination of items in response to acceptance of recommended item(s) Operation 304 will be discussed in more detail in connection with FIG. 4 below.

In operation 306, the offer system 118 receive a buyer offer price for the combination of items. The buyer offer price comprises an overall price the buyer wants to pay for the combination of items from the multiple sellers. Operation 306 assumes that the buyer accepts one or more of the recommended items presented in operation 304. Alternatively, operation 306 may be based on the buyer adding a combination of items from different sellers in operation 302. In this alternative embodiment, operation 304 is optional or not needed.

In operation 308, the analysis engine 208 generates a split offer price for each seller based on the buyer offer price. Operation 308 will be discussed in more detail in connection with FIG. 5 below.

In operation 310, the split offer price is presented by the communication module 202 to each seller. In some embodiments, the user interface module 204 generates and causes presentation of a seller user interface to each seller that indicates the items of the seller, original price for each item of the seller, and the split offer price. In other embodiments, the split offer price may be presented via an email, text message, phone call, or other communication method managed by the communications module 202.

In operation 312, a determination is made as to whether each seller accepts the split offer price. In some embodiments, the seller user interface presents one or more fields that allow the seller to accept the split price, reject the split price, or present a counteroffer. Similarly, an email or text message provides options for the seller to respond to the split offer price.

In embodiments where a seller rejects their split offer price, the seller has an option to present a counteroffer. Operation 314 is optional in some embodiments.

In operation 316, a transaction is completed assuming that all parties agree to a final price. The final price can comprise the buyer offer price based on all sellers accepting their corresponding split offer price. Alternatively, the final price comprises an adjusted price if one or more of the sellers rejects their split offer price or presents a counteroffer that is accepted by the buyer. In a further alternative embodiment, the final price comprises an adjust price based on a removal of one or more items from sellers that reject their split offer price.

Figure 4:
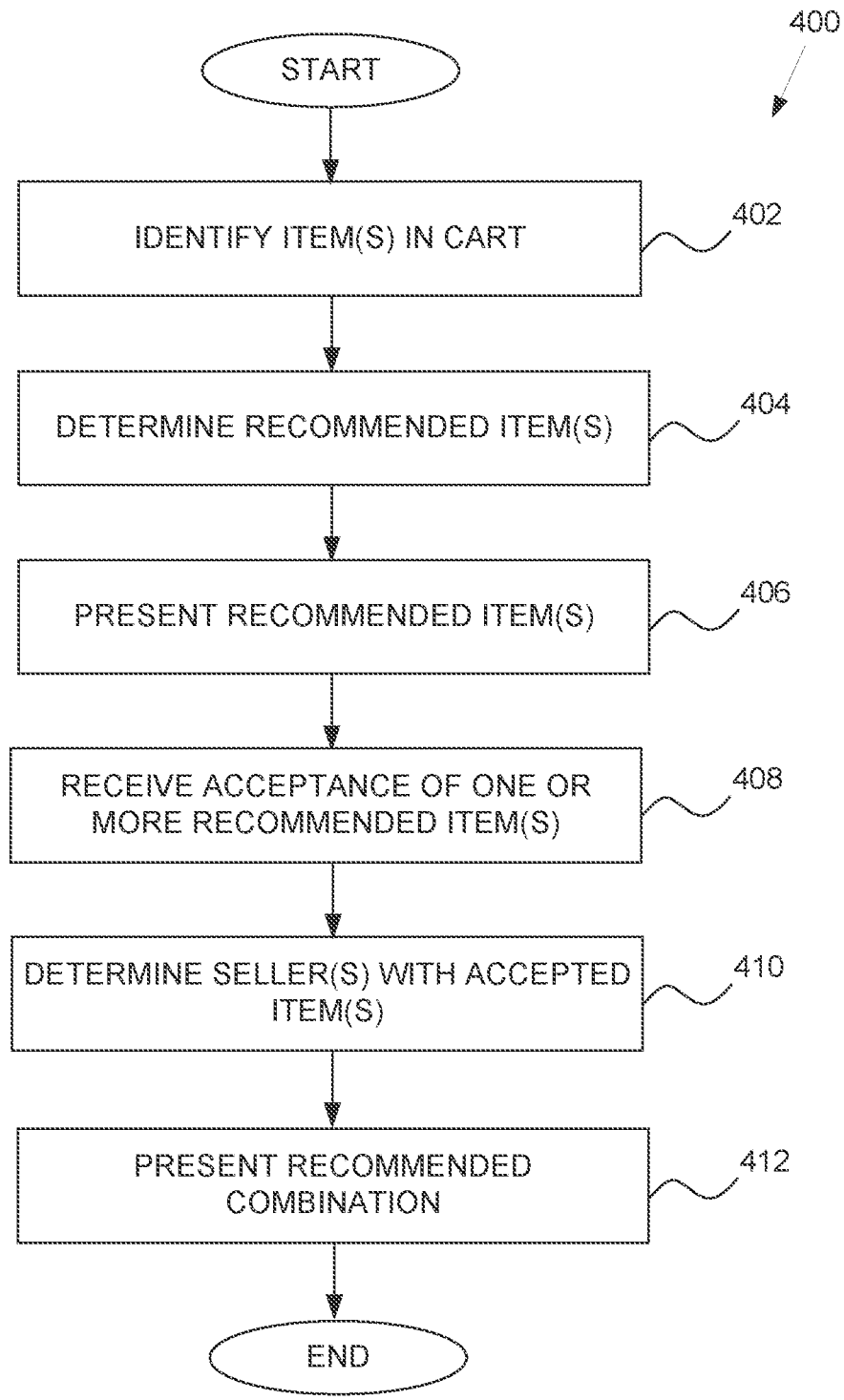
FIG. 4 is a flowchart illustrating operations of a method for recommending items and generating a multi-listing combination of items, according to some example embodiments.

FIG. 4 is a flowchart illustrating operations of a method 400 (e.g., operation 304) for presenting recommended items and generating a multi-listing combination, according to some example embodiments. Operations in the method 400 may be performed by the offer system 118, using components described above with respect to FIG. 2. Accordingly, the method 400 is described by way of example with reference to the offer system 118. However, it shall be appreciated that at least some of the operations of the method 400 may be deployed on various other hardware configurations or be performed by similar components residing elsewhere in the network environment 100. Therefore, the method 400 is not intended to be limited to the offer system 118.

In operation 402, the combination generator 206 identifies items already in the virtual cart. In some cases, the combination generator 206 may also identify a category of each item in the virtual cart. The identification can be based on a corresponding listing for each item.

In operation 404, the combination generator 206 determines item(s) to recommend to the buyer in order to generate a combination of items with which the buyer can make an offer. In some embodiments, the combination generator 206, based on the identified items in operation 402, determines related items that can be combined with the one or more items in the virtual cart. In some embodiments, the combination generator 206, in a background process, analyzes (e.g., pre-processes) item listings of items available in the networked system 102 along with historical data (e.g., past transactions involve the items or category of the item) and generates combinations of related items (e.g., based on categories) that can be offered together (e.g., frequent bought together). At run time, the combination generator 206 compares the items or categories of items in the virtual cart to items or categories of items that were previously determined to be related to determine the items to recommend.

In other embodiments, the combination generator 206 compares the items or category of items in the virtual cart to items that the buyer has shown interest in which may be related to the item in the virtual cart to determine the item(s) to recommend. For example, the combination generator 206 can access the buyer's wishlist and identify an item that may be related to an item in the virtual cart and recommend that the items from the wishlist be added to virtual cart. In another example, the combination generator 206 can access the buyer's purchase history and identify a related item. For instance, the buyer may have purchases a bicycle in the past and now has a bike helmet in the virtual cart. The combination generator 206 can recommend a portable bike tire pump to the buyer. Alternatively, the items can be recommended from the buyer's wishlist, watchlist, or past browsing history that is not related to the item(s) in the virtual cart. Therefore, the recommended items can, for example, comprise one or more of related items (e.g., frequently bought together), items from the buyer's wishlist or watchlist, or related items to items the user has browsed or purchased in the past.

In operation 406, the recommended items are presented to the buyer. In example embodiments, the user interface module 204 updates the buyer user interface displaying the virtual cart to show the recommended items.

In operation 408, the offer system 118 receives an indication of acceptance of one or more recommended items. In some embodiments, the buyer user interface includes one or more selections that allow the buyer to accept a recommendation of one or more items to the item(s) that the buyer has already placed in their virtual cart resulting in a multi-listing combination of items.

In operation 410, the combination generator 206 determine one or more sellers that are selling the accepted, recommended item(s). In example embodiments, the combination generator 206 may first determine whether any sellers of items already in the virtual cart (before the recommendation was accepted) is selling the additional item. This is done in an effort to reduce the number of sellers involved in the combination of items. If none of these sellers are selling the additional item(s), the combination generator 206 then searches the networked system 102 to identify, for example, sellers with a lowest price for the additional item or that are known to be willing to negotiate on price (e.g., based on past transactions). Once identified, the combination generator 206 determines a total original price for the combination of items.

In operation 412, the offer system 118 presents the combination of items in the virtual cart along with the total original price for the combination of items.

Figure 5:
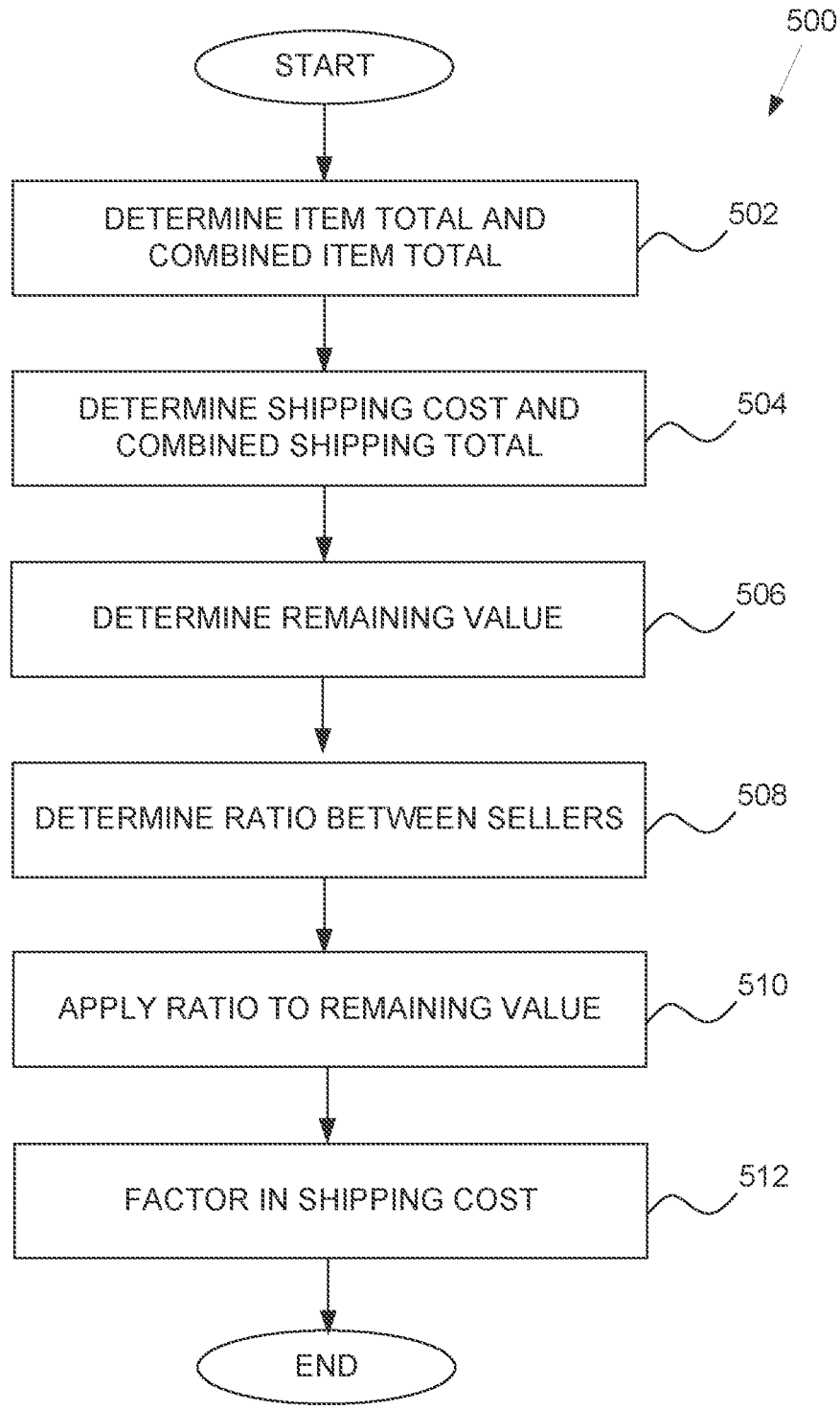
FIG. 5 is a flowchart illustrating operations of a method for generating a split offer price, according to some example embodiments.

FIG. 5 is a flowchart illustrating operations of a method 500 (e.g., operation 308) for generating a split offer price, according to some example embodiments. Operations in the method 500 may be performed by the offer system 118 (e.g., the analysis engine 208). Accordingly, the method 500 is described by way of example with reference to the offer system 118. However, it shall be appreciated that at least some of the operations of the method 500 may be deployed on various other hardware configurations or be performed by similar components residing elsewhere in the network environment 100. Therefore, the method 500 is not intended to be limited to the offer system 118.

In operation 502, the analysis engine 208 determines an item total for each seller and a combination item total for all sellers. In some embodiments, the analysis engine 208 accesses the item listings of each item in the combination of items to verify an original price for each item in the combination. In other embodiments, the analysis engine 208 takes the original price from the virtual cart. The original price for item(s) from a same seller are summed together to obtain the item total for the seller. All original prices of items in the combination are summed together to obtain the combined item total.

In operation 504, the analysis engine 208 determines shipping cost for each seller and a combined shipping total. In some embodiments, the shipping cost can be reduced by combining shipping for items from the same seller or combining items from sellers in a same location (e.g., from a same distribution warehouse). The analysis engine 208 has access to item shipping information such that the analysis engine 208 can determine a weight and dimension for each item and determine whether items can be combined into a same shipping container (e.g., a flat rate post office box) at a shipping rate that is less than shipping the items individually.

In operation 506, the analysis engine 208 determines a remaining value. In example embodiments, the analysis engine 208 subtracts the combined shipping total, which is not negotiable, from the buyer offer price to obtain the remaining value.

In operation 508, the analysis engine 208 determines a ratio for each seller. In example embodiments, the ratio is determined by dividing each seller's item total by the combined item total.

In operation 510, the analysis engine 208 applies the ratio of each seller to the remaining value to determine a split portion for each seller. The shipping cost for each seller is then added to their corresponding split portion to generate the split offer price for each seller in operation 512.

Figure 6:
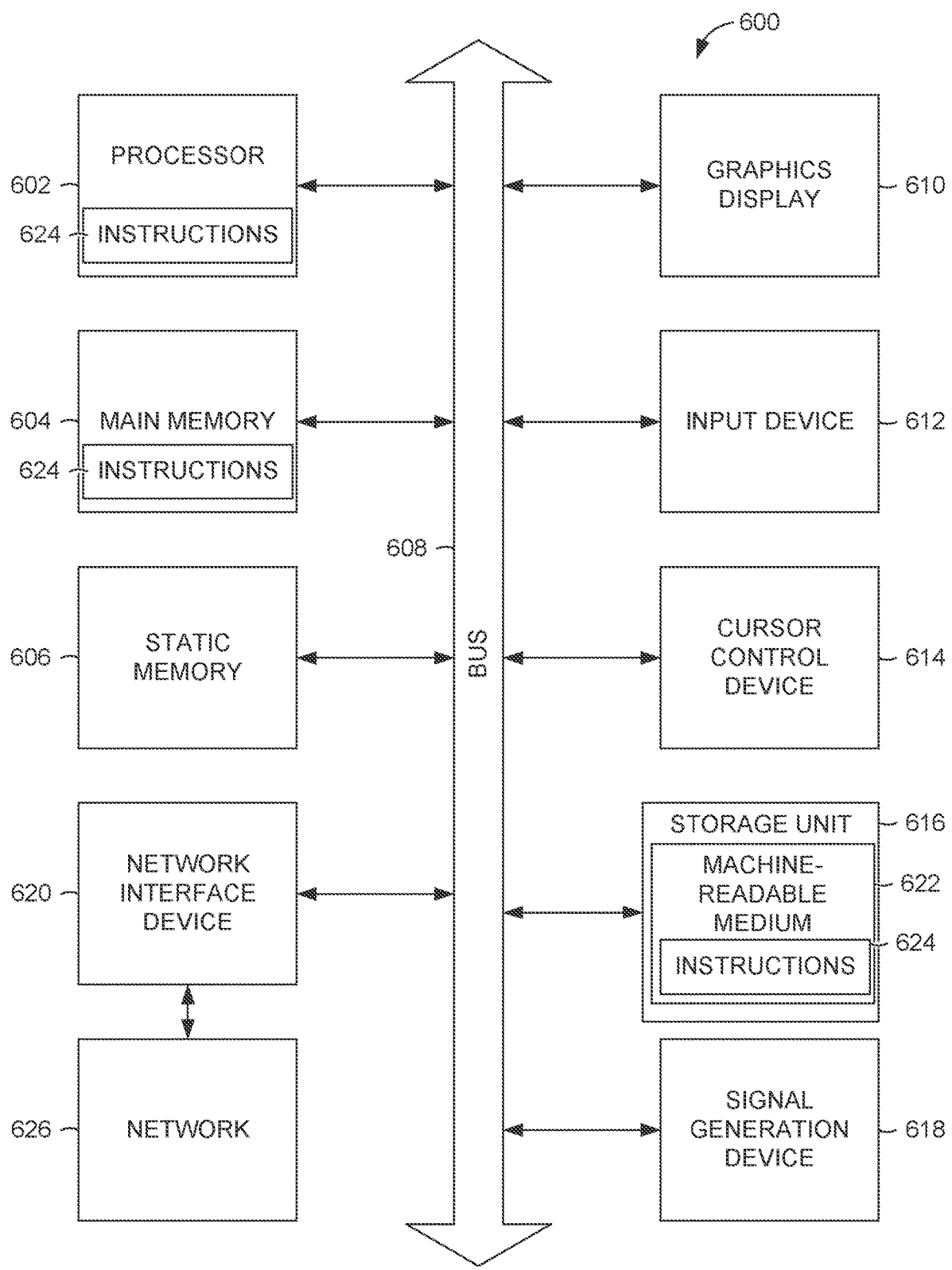
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3 through FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 1002 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-readable medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing a multi-listing combined offer. The method comprises receiving, by a networked system, an indication to add a combination of items from multiple sellers into a virtual cart of a buyer; in response to the receiving the indication, causing presentation of a user interface showing a combination of items from multiple sellers in the virtual cart; receiving, from the buyer via the user interface, a buyer offer price for the combination of items from the multiple sellers; in response to receiving the buyer offer price, accessing, by the networked system from a data storage, item information for each item of the combination of items, the item information including a seller identifier, an original item price, and shipping cost for each item; generating, by one or more hardware processors of the networked system based on the accessed item information and the buyer offer price, a split offer price for each of the multiple seller, the split offer price being a split of the buyer offer price between the multiple sellers; and causing presentation of the split offer price to a corresponding seller of the multiple sellers.

In example 2, the subject matter of example 1 can optionally include wherein the generating the split offer price comprises determining a seller item total for items from a same seller for each of the multiple sellers; determining a shipping cost for each of the multiple sellers; determining a remaining value by subtracting a summation of the shipping costs for the multiple sellers from the buyer offer price; determining a ratio, for each of the multiple sellers based on each seller's corresponding item total and a summation of item totals for all of the multiple sellers; applying the ratio, for each of the multiple sellers, to the remaining value to generate a split portion for each of the multiple sellers; and determining the split offer price by adding the shipping cost to the split portion for each of the multiple sellers.

In example 3, the subject matter of examples 1-2 can optionally include wherein the shipping cost for a seller of the multiple sellers is less than a summation of individual shipping cost for each of the items from the seller, the shipping cost being based on combining shipping of at least two of the items in the combination of items into a single container.

In example 4, the subject matter of examples 1-3 can optionally include, in response to the causing presentation of the split offer price to the corresponding seller, receiving an acceptance or rejection of the split offer price from the corresponding seller.

In example 5, the subject matter of examples 1-4 can optionally include in response to the causing presentation of the split offer price to the corresponding seller, receiving a counteroffer from the corresponding seller; deriving an updated price by adjusting the buyer offer price with the counteroffer; and causing presentation, via the user interface, of the updated price to the buyer.

In example 6, the subject matter of examples 1-5 can optionally include identifying an item in the virtual cart; determining one or more recommended items based, in part, on the item in the virtual cart; presenting the one or more recommended items to the buyer; and receiving an indication of acceptance of the one or more related items.

In example 7, the subject matter of examples 1-6 can optionally include wherein the receiving the indication to add the combination of items from multiple sellers into the virtual cart comprises receiving the indication of acceptance of the one or more related items.

In example 8, the subject matter of examples 1-7 can optionally include, in response to the receiving of the indication of acceptance, determining sellers having listings for the one or more items; determining an original price for each of the one or more items for each of the sellers having the listings for the one or more items; generating a recommended combination of items, the generating comprising grouping a set of the sellers having the one or more items and the item in the virtual cart, wherein the set of sellers in combination offer all the items of the recommended combination; and causing presentation of the recommended combination of items and a total original price for the recommended combination to the buyer, the total original price being a summation of the original prices for the items of the recommended combination.

In example 9, the subject matter of examples 1-8 can optionally include wherein the grouping the set of sellers comprises selecting and combining sellers having a lowest combined total original price.

Example 10 is a system for managing a multi-listing combined offer. The system includes one or more processors and a storage device storing instructions that, when executed by the one or more hardware processors, causes the one or more hardware processors to perform operations comprising receiving an indication to add a combination of items from multiple sellers into a virtual cart of a buyer; in response to the receiving the indication, causing presentation of a user interface showing a combination of items from multiple sellers in the virtual cart; receiving, from the buyer via the user interface, a buyer offer price for the combination of items from the multiple sellers; in response to receiving the buyer offer price, accessing, from a data storage, item information for each item of the combination of items, the item information including a seller identifier, an original item price, and shipping cost for each item; generating, based on the accessed item information and the buyer offer price, a split offer price for each of the multiple seller, the split offer price being a split of the buyer offer price between the multiple sellers; and causing presentation of the split offer price to a corresponding seller of the multiple sellers.

In example 11 the subject matter of example 10 can optionally include wherein the generating the split offer price comprises determining a seller item total for items from a same seller for each of the multiple sellers; determining a shipping cost for each of the multiple sellers; determining a remaining value by subtracting a summation of the shipping costs for the multiple sellers from the buyer offer price; determining a ratio, for each of the multiple sellers based on each seller's corresponding item total and a summation of item totals for all of the multiple sellers; applying the ratio, for each of the multiple sellers, to the remaining value to generate a split portion for each of the multiple sellers; and determining the split offer price by adding the shipping cost to the split portion for each of the multiple sellers.

In example 12, the subject matter of examples 10-11 can optionally include wherein the shipping cost for a seller of the multiple sellers is less than a summation of individual shipping cost for each of the items from the seller, the shipping cost being based on combining shipping of at least two of the items in the combination of items into a single container.

In example 13, the subject matter of examples 10-12 can optionally include, in response to the causing presentation of the split offer price to the corresponding seller, receiving an acceptance or rejection of the split offer price from the corresponding seller.

In example 14, the subject matter of examples 10-13 can optionally include, in response to the causing presentation of the split offer price to the corresponding seller, receiving a counteroffer from the corresponding seller; deriving an updated price by adjusting the buyer offer price with the counteroffer; and causing presentation, via the user interface, of the updated price to the buyer.

In example 15, the subject matter of examples 10-14 can optionally include identifying an item in the virtual cart; determining one or more recommended items based, in part, on the item in the virtual cart; presenting the one or more recommended items to the buyer; and receiving an indication of acceptance of the one or more related items.

In example 16, the subject matter of examples 10-15 can optionally include wherein the receiving the indication to add the combination of items from multiple sellers into the virtual cart comprises receiving the indication of acceptance of the one or more related items.

In example 17, the subject matter of examples 10-16 can optionally include, in response to the receiving of the indication of acceptance, determining sellers having listings for the one or more items; determining an original price for each of the one or more items for each of the sellers having the listings for the one or more items; generating a recommended combination of items, the generating comprising grouping a set of the sellers having the one or more items and the item in the virtual cart, wherein the set of sellers in combination offer all the items of the recommended combination; and causing presentation of the recommended combination of items and a total original price for the recommended combination to the buyer, the total original price being a summation of the original prices for the items of the recommended combination.

In example 18, the subject matter of examples 10-17 can optionally include wherein the grouping the set of sellers comprises selecting and combining sellers having a lowest combined total original price Example 19 is a machine-storage medium for managing a multi-listing combined offer. The machine-storage medium configures one or more processors to perform operations comprising receiving an indication to add a combination of items from multiple sellers into a virtual cart of a buyer; in response to the receiving the indication, causing presentation of a user interface showing a combination of items from multiple sellers in the virtual cart; receiving, from the buyer via the user interface, a buyer offer price for the combination of items from the multiple sellers; in response to receiving the buyer offer price, accessing, from a data storage, item information for each item of the combination of items, the item information including a seller identifier, an original item price, and shipping cost for each item; generating, based on the accessed item information and the buyer offer price, a split offer price for each of the multiple seller, the split offer price being a split of the buyer offer price between the multiple sellers; and causing presentation of the split offer price to a corresponding seller of the multiple sellers.

In example 20, the subject matter of example 19 can optionally include wherein the generating the split offer price comprises determining a seller item total for items from a same seller for each of the multiple sellers; determining a shipping cost for each of the multiple sellers; determining a remaining value by subtracting a summation of the shipping costs for the multiple sellers from the buyer offer price; determining a ratio, for each of the multiple sellers based on each seller's corresponding item total and a summation of item totals for all of the multiple sellers; applying the ratio, for each of the multiple sellers, to the remaining value to generate a split portion for each of the multiple sellers; and determining the split offer price by adding the shipping cost to the split portion for each of the multiple sellers.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   based on items from multiple sellers in a virtual cart, identifying one or more recommended items to combine with the items in the virtual cart;
   presenting the one or more recommended items to a buyer;
   in response to acceptance of a recommended item, determining whether one of the multiple sellers is offering the recommended item;
   based on a determination that one of the multiple sellers is offering the recommended item, adding the recommended item from one of the multiple sellers to the virtual cart;
   receiving a buyer offer price for the items from the multiple sellers including the recommended item;
   in response to receiving the buyer offer price, generating, by one or more processors of the networked system, a split offer price for each of the multiple sellers, the split offer price being a split of the buyer offer price between the multiple sellers, the generating the split offer price comprising:
      determining a seller item total for items from a same seller for each of the multiple sellers;
      determining a ratio, for each of the multiple sellers based on each seller's corresponding item total and a summation of item totals for all of the multiple sellers; and
      applying the ratio, for each of the multiple sellers, to the buyer offer price to generate a split portion for each of the multiple sellers; and
   causing presentation of the split offer price based on the split portion to a corresponding seller of the multiple sellers.

2. The method of claim 1, further comprising:
   based on none of the multiple sellers offering the recommended item, performing a search for a further seller with a lowest price for the recommended item.

3. The method of claim 1, further comprising:
   based on none of the multiple sellers offering the recommended item, performing a search for a further seller selling the recommended item that is known, based on past transactions, to be willing to negotiate on price.

4. The method of claim 1, wherein the generating the split offer price further comprises:
   determining a shipping cost for each of the multiple sellers; and
   determining a remaining value by subtracting a summation of the shipping costs for the multiple sellers from the buyer offer price,
   wherein the applying the ratio comprises applying the ratio to the remaining value, and wherein the split offer price for each of the multiple sellers comprises the shipping cost for each of the multiple sellers added to the split portion for each of the multiple sellers.

5. The method of claim 4, wherein the shipping cost for a seller of the multiple sellers is less than a summation of individual shipping cost for each of the items from the seller, the shipping cost being based on combining shipping of at least two of the items in the virtual cart into a single shipping container.

6. The method of claim 1, further comprising:
in response to the causing presentation of the split offer price to the corresponding seller, receiving an acceptance or rejection of the split offer price from the corresponding seller.

7. The method of claim 1, further comprising:
in response to the causing presentation of the split offer price to the corresponding seller, receiving a counteroffer from the corresponding seller;
deriving an updated price by adjusting the buyer offer price with the counteroffer; and
causing presentation, via a user interface, of the updated price to the buyer.

8. The method of claim 1, wherein the identifying the one or more recommended items comprises identifying at least one recommended item from a wishlist or watchlist of the buyer that is related to an item in the virtual cart.

9. The method of claim 1, wherein the identifying the one or more recommended items comprises identifying at least one recommended item that is related to an item in the virtual cart and an item previous purchased by the buyer.

10. A system comprising:
one or more hardware processors; and
a storage device storing instructions that, when executed by the one or more hardware processors, causes the one or more hardware processors to perform operations comprising:
based on items from multiple sellers in a virtual cart, identifying one or more recommended items to combine with the items in the virtual cart;
presenting the one or more recommended items to a buyer;
in response to acceptance of a recommended item, determining whether one of the multiple sellers is offering the recommended item;
based on a determination that one of the multiple sellers is offering the recommended item, adding the recommended item from one of the multiple sellers to the virtual cart;
receiving a buyer offer price for the items from the multiple sellers including the recommended item;
in response to receiving the buyer offer price, generating a split offer price for each of the multiple sellers, the split offer price being a split of the buyer offer price between the multiple sellers, the generating the split offer price comprising:
determining a seller item total for items from a same seller for each of the multiple sellers;
determining a ratio, for each of the multiple sellers based on each seller's corresponding item total and a summation of item totals for all of the multiple sellers; and
applying the ratio, for each of the multiple sellers, to the buyer offer price to generate a split portion for each of the multiple sellers; and
causing presentation of the split offer price based on the split portion to a corresponding seller of the multiple sellers.

11. The system of claim 10, wherein the operations further comprise:
based on none of the multiple sellers offering the recommended item, performing a search for a further seller with a lowest price for the recommended item.

12. The system of claim 10, wherein the operations further comprise:
based on none of the multiple sellers offering the recommended item, performing a search for a further seller selling the recommended item that is known, based on past transactions, to be willing to negotiate on price.

13. The system of claim 10, wherein the generating the split offer price further comprises:
determining a shipping cost for each of the multiple sellers; and
determining a remaining value by subtracting a summation of the shipping costs for the multiple sellers from the buyer offer price,
wherein the applying the ratio comprises applying the ratio to the remaining value, and
wherein the split offer price for each of the multiple sellers comprises the shipping cost for each of the multiple sellers added to the split portion for each of the multiple sellers.

14. The system of claim 13, wherein the shipping cost for a seller of the multiple sellers is less than a summation of individual shipping cost for each of the items from the seller, the shipping cost being based on combining shipping of at least two of the items in the virtual cart into a single shipping container.

15. The system of claim 10, wherein the operations further comprise:
in response to the causing presentation of the split offer price to the corresponding seller, receiving an acceptance or rejection of the split offer price from the corresponding seller.

16. The system of claim 10, wherein the operations further comprise:
in response to the causing presentation of the split offer price to the corresponding seller, receiving a counteroffer from the corresponding seller;
deriving an updated price by adjusting the buyer offer price with the counteroffer; and
causing presentation, via a user interface, of the updated price to the buyer.

17. The system of claim 10, wherein the identifying the one or more recommended items comprises identifying at least one recommended item from a wishlist or watchlist of the buyer that is related to an item in the virtual cart.

18. The system of claim 10, wherein the identifying the one or more recommended items comprises identifying at least one recommended item that is related to an item in the virtual cart and an item previous purchased by the buyer.

19. A non-transitory machine-storage medium storing instructions that, when executed by one or more processors of a machine, cause the one or more processors to perform operations comprising:
based on items from multiple sellers in a virtual cart, identifying one or more recommended items to combine with the items in the virtual cart;
presenting the one or more recommended items to a buyer;

in response to acceptance of a recommended item, determining whether one of the multiple sellers is offering the recommended item;

based on a determination that one of the multiple sellers is offering the recommended item, adding the recommended item from one of the multiple sellers to the virtual cart;

receiving a buyer offer price for the items from the multiple sellers including the recommended item;

in response to receiving the buyer offer price, generating a split offer price for each of the multiple sellers, the split offer price being a split of the buyer offer price between the multiple sellers, the generating the split offer price comprising:

determining a seller item total for items from a same seller for each of the multiple sellers;

determining a ratio, for each of the multiple sellers based on each seller's corresponding item total and a summation of item totals for all of the multiple sellers; and applying the ratio, for each of the multiple sellers, to the buyer offer price to generate a split portion for each of the multiple sellers; and causing presentation of the split offer price based on the split portion to a corresponding seller of the multiple sellers.

20. The non-transitory machine-storage medium of claim 19, wherein the generating the split offer price further comprises:

determining a shipping cost for each of the multiple sellers; and determining a remaining value by subtracting a summation of the shipping costs for the multiple sellers from the buyer offer price, wherein the applying the ratio comprises applying the ratio to the remaining value, and wherein the split offer price for each of the multiple sellers comprises the shipping cost for each of the multiple sellers added to the split portion for each of the multiple sellers.

* * * * *